United States Patent
Dietrich et al.

(10) Patent No.: US 9,228,461 B2
(45) Date of Patent: Jan. 5, 2016

(54) BI-DIRECTIONAL TRACTOR EXHAUST SYSTEM

(75) Inventors: Benjamin E. Dietrich, Evans, GA (US); Nicholas R. Wilson, Alexandria, VA (US); Christopher T. McCord, Thomson, GA (US)

(73) Assignee: DEERE & COMPANY, Moline, IL (US)

( * ) Notice: Subject to any disclaimer, the term of this patent is extended or adjusted under 35 U.S.C. 154(b) by 323 days.

(21) Appl. No.: 13/562,925

(22) Filed: Jul. 31, 2012

(65) Prior Publication Data

US 2014/0034171 A1 Feb. 6, 2014

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/021* | (2006.01) |
| *F01N 13/00* | (2010.01) |
| *F01N 13/08* | (2010.01) |
| *F01N 1/16* | (2006.01) |

(52) U.S. Cl.
CPC .............. *F01N 3/0217* (2013.01); *F01N 1/166* (2013.01); *F01N 13/002* (2013.01); *F01N 13/082* (2013.01); *F01N 13/085* (2013.01); *F01N 2240/20* (2013.01); *F01N 2240/36* (2013.01); *F01N 2260/20* (2013.01); *F01N 2340/04* (2013.01); *F01N 2410/02* (2013.01); *F01N 2410/04* (2013.01); *F01N 2470/14* (2013.01); *F01N 2470/18* (2013.01); *F01N 2590/08* (2013.01); *F01N 2900/1404* (2013.01); *Y02T 10/20* (2013.01); *Y10T 137/877* (2015.04)

(58) Field of Classification Search
USPC .................... 60/287, 288, 297, 311, 323, 324
See application file for complete search history.

(56) References Cited

U.S. PATENT DOCUMENTS

| | | | |
|---|---|---|---|
| 5,388,408 A | 2/1995 | Lawrence | |
| 6,584,767 B1 | 7/2003 | Koenig | |
| 6,938,729 B2 | 9/2005 | Wörner et al. | |
| 7,121,088 B2 | 10/2006 | Lavin | |
| 7,686,130 B1 | 3/2010 | Quaglia | |
| 7,743,604 B1 * | 6/2010 | Albanesi | 60/287 |
| 2007/0057564 A1 * | 3/2007 | Colling | 298/1 H |

* cited by examiner

*Primary Examiner* — Audrey K Bradley
*Assistant Examiner* — Dapinder Singh

(57) ABSTRACT

A bi-directional tractor exhaust system includes a downwardly directed exhaust pipe connected to an upwardly directed exhaust pipe. An exhaust pipe valve may be mounted in the downwardly directed exhaust pipe. An actuator may be connected to the exhaust pipe valve and may be moveable between a first position opening the exhaust pipe valve to direct exhaust through the downwardly directed exhaust pipe, and a second position closing the exhaust pipe valve to direct exhaust through the upwardly directed exhaust pipe.

7 Claims, 6 Drawing Sheets

US 9,228,461 B2

BI-DIRECTIONAL TRACTOR EXHAUST SYSTEM

FIELD OF THE INVENTION

This invention relates generally to tractor exhaust systems, and specifically to exhaust systems for use on small and/or compact tractors having normal and elevated exhaust temperatures.

BACKGROUND OF THE INVENTION

Small and/or compact tractors with internal combustion engines have commonly used downwardly directed exhaust pipes for many applications. Downwardly directed exhaust pipes direct exhaust below the internal combustion engine and are preferred for small and/or compact tractor applications such as mowing, road transport, general field work and work inside buildings. Upwardly directed exhaust pipes direct exhaust up above the engine and are more suited for other applications such as loader work, snow blowing, working in vegetable fields or on sensitive turf grass, working near livestock, or stationary applications including running an aeration pump or grain auger.

Recently, efforts to reduce emissions including Tier 4 regulations have resulted in small and/or compact tractors having elevated exhaust temperatures at certain times. Specifically, emissions reduction devices such as diesel particulate filters (DPFs) periodically result in elevated exhaust temperatures such as approximately 600 degrees C. during regeneration. Other emissions reduction devices or exhaust treatment devices also may result in high exhaust temperatures. However, it is preferred that a small and/or compact tractor's downwardly directed exhaust temperatures should not exceed approximately 200 degrees C., which may be the maximum normal operating temperature of the exhaust.

Attempts to reduce high exhaust temperature down to the normal maximum exhaust temperature of 200 degrees C. have not been successfully implemented in small and/or compact tractors. For example, aspirators and venturis have not been effective because space constraints prevent sizing aspirators and venturis large enough to achieve the 200 degree C. outlet temperature needed for downward exhaust.

A small and/or compact tractor exhaust system is needed to prevent downwardly directed exhaust exceeding 200 degrees C. A system is needed that limits or reduces high temperature downwardly directed exhaust without aspirators or venturis. A system is needed that allows exhaust to exit through downwardly directed exhaust pipes for some applications, and through upwardly directed exhaust pipes for other applications.

SUMMARY OF THE INVENTION

A bi-directional tractor exhaust system includes a downwardly directed exhaust pipe, and upwardly directed exhaust pipe, and an intermediate exhaust pipe between the downwardly directed and upwardly directed exhaust pipes. The intermediate exhaust pipe may be connected to the outlet of a diesel particulate filter. An exhaust pipe valve in the downwardly directed exhaust pipe may be opened or closed by an actuator to direct exhaust through the downwardly directed exhaust pipe when exhaust temperature from the diesel particulate filter is in a normal temperature range, and through the upwardly directed exhaust pipe when the exhaust temperature is in an elevated range. The system allows exhaust to exit downwardly directed exhaust pipes for some applications, and through upwardly directed exhaust pipes for other applications.

DESCRIPTION OF THE PREFERRED EMBODIMENT

Figure 1:
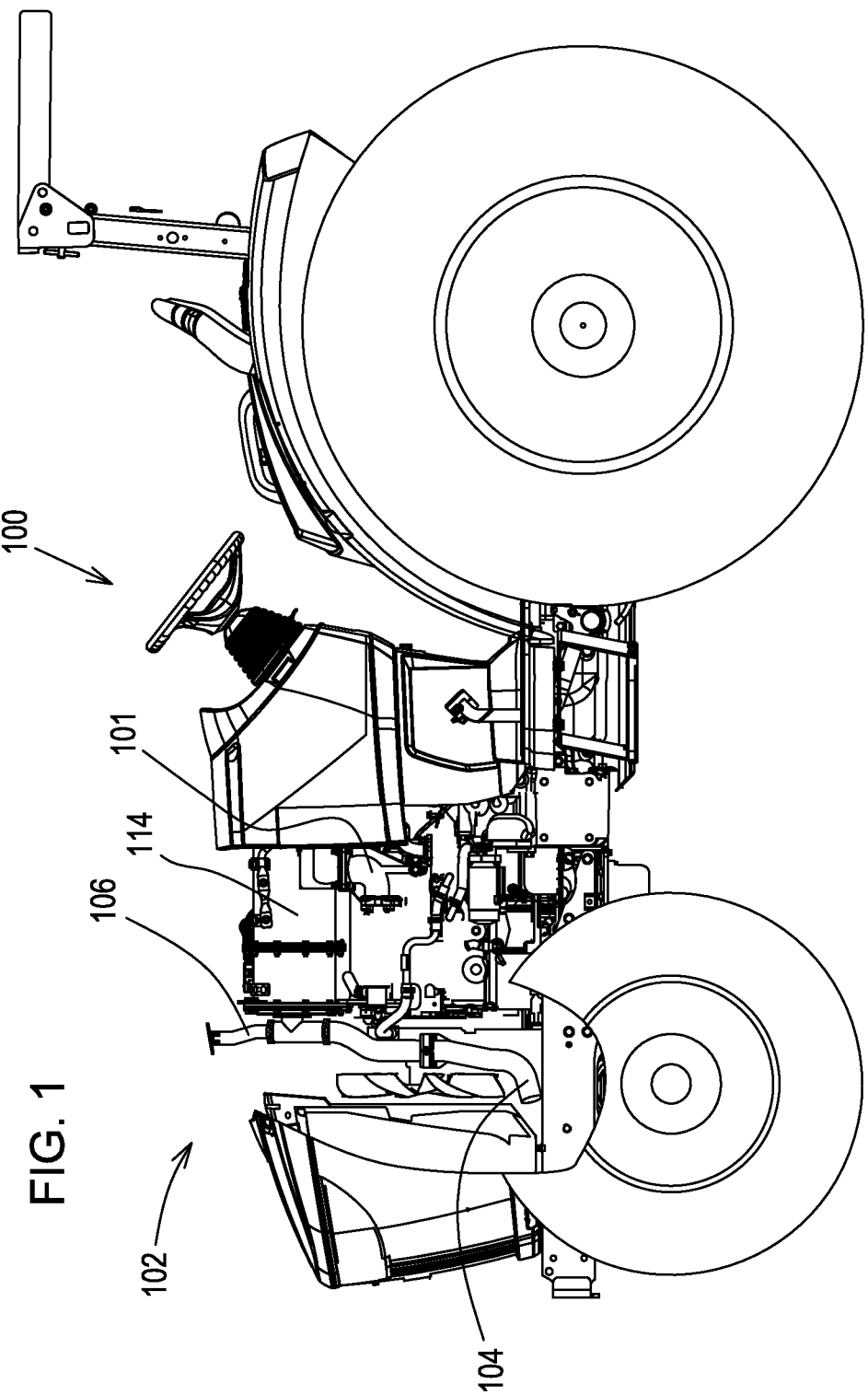
FIG. 1 is a side view of a small and/or compact tractor with a bi-directional tractor exhaust system according to one embodiment of the invention.

In an embodiment of the invention shown in FIG. 1, small and/or compact tractor 100 may be provided with bi-directional tractor exhaust system 102. The bi-directional tractor exhaust system may include one or more valves to direct exhaust from internal combustion engine 101 either below the engine through downwardly directed exhaust pipe 104, or vertically above the engine through upwardly directed exhaust pipe 116. The internal combustion engine may be a diesel engine with a diesel particulate filter 114, or alternatively may be a gas engine. Intermediate exhaust pipe 106 may be positioned between the downwardly directed exhaust pipe and upwardly directed exhaust pipe at or adjacent the outlet of diesel particulate filter 114. Alternatively, the downwardly directed exhaust pipe and upwardly directed exhaust pipe may be joined together at the outlet of any other emissions reduction or exhaust treatment device having high exhaust temperatures at certain times of operation.

Figure 2:
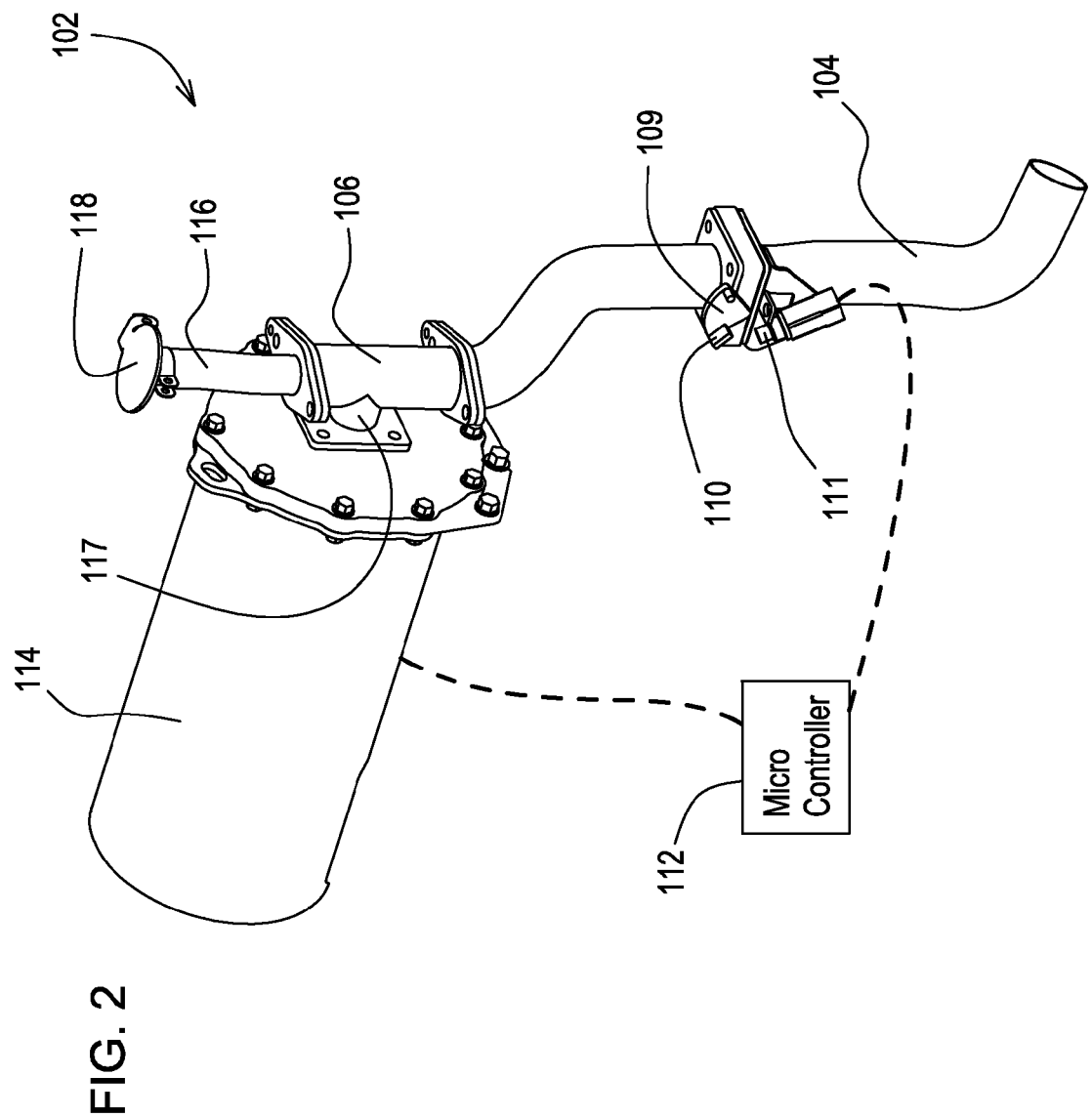
FIG. 2 is a perspective view of a bi-directional tractor exhaust system according to one embodiment of the invention
Figure 3:
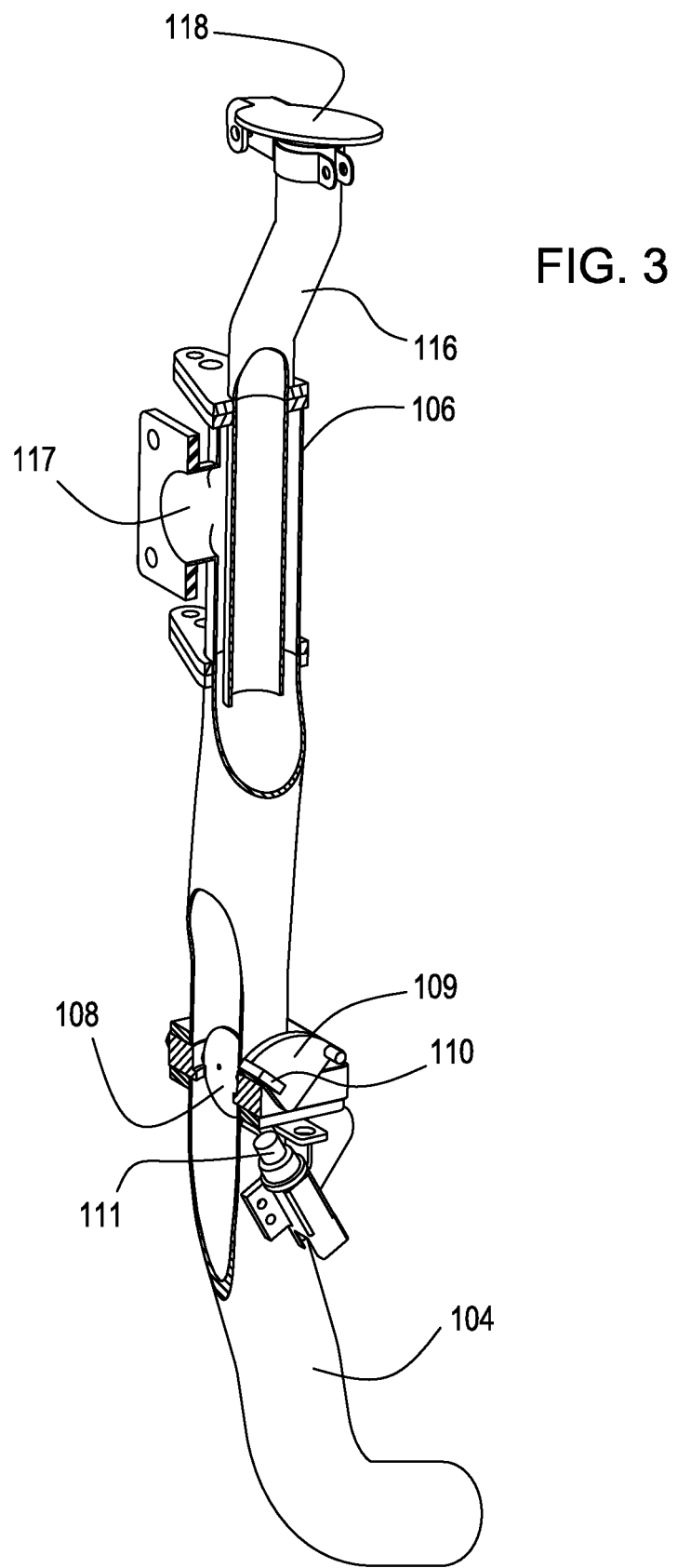
FIG. 3 is a perspective view, partially in section, of a bi-directional tractor exhaust system according to the embodiment of FIG. 2.

In an embodiment of the invention shown in FIGS. 2-3, the bi-directional tractor exhaust system may include exhaust pipe valve 108 in downwardly directed exhaust pipe 104. In FIG. 3, exhaust pipe valve 108 is shown in a first or open position so that exhaust exits through the downwardly directed exhaust pipe. Exhaust pipe valve 108 may be a butterfly valve that an operator may open and close using actuator 109. Exhaust pipe valve 108 also may be moved to a second or closed position, so that exhaust exits upwardly through upward exhaust pipe 116. The actuator may include tab 110 that may contact on-off switch 111 when the actuator closes exhaust pipe valve 108. Switch 111 may be connected to controller 112. The controller may include logic preventing regeneration of diesel particulate filter 114 unless exhaust pipe valve 108 is in the second closed as indicated by the position of switch 111.

In the embodiment of FIGS. 2-3, upwardly directed exhaust pipe 116 may be located within intermediate exhaust pipe 106. The upwardly directed exhaust pipe may have a smaller diameter than the intermediate exhaust pipe and may extend below outlet 117 of diesel particulate filter 114. Cap 118 may be pivotably mounted to the top of upward exhaust pipe 116. The cap's weight may urge the cap to the closed position when exhaust pipe valve 108 is open and exhaust exits downwardly. The cap may pivot to an open position when exhaust pipe valve 108 is closed and there is increased pressure in upward exhaust pipe 116.

Figure 4:
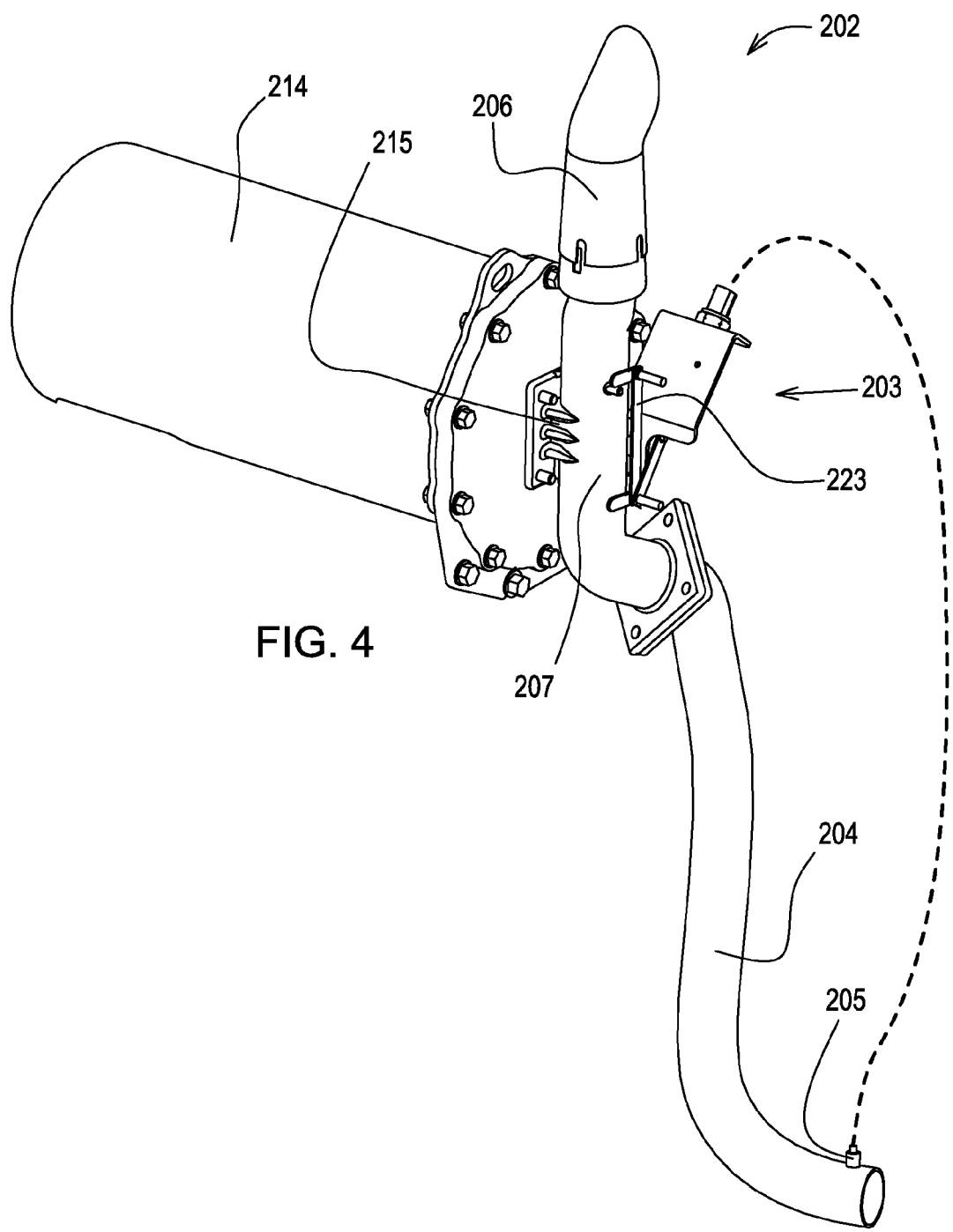
FIG. 4 is a perspective view of a bi-directional tractor exhaust system according to a second embodiment of the invention.
Figure 5:
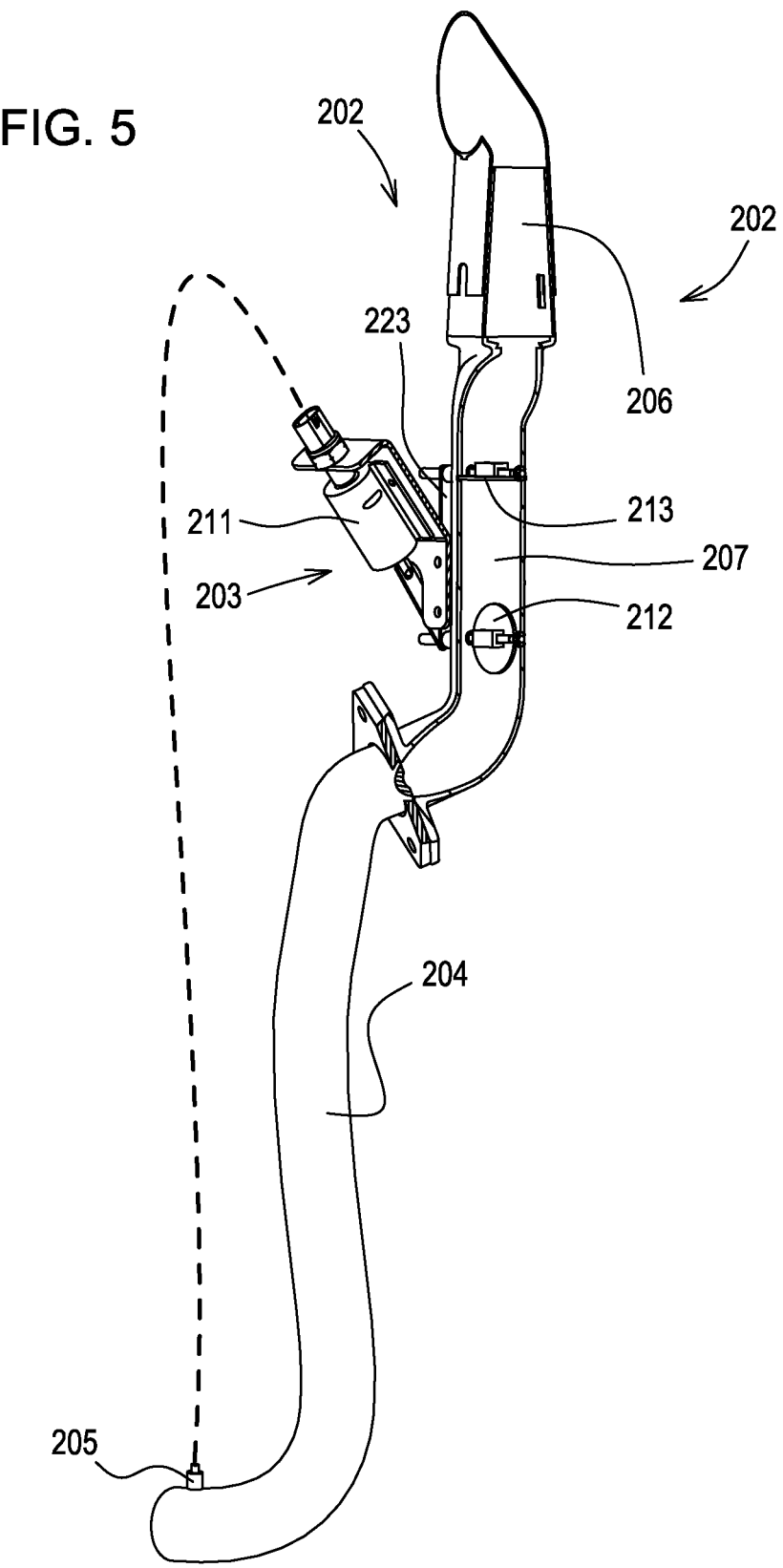
FIG. 5 is a perspective view, partially in section, of a bi-directional tractor exhaust system according to the embodiment of FIG. 4.

In the embodiment of FIGS. 4-5, bi-directional tractor exhaust system 202 may include first and second exhaust valves 212, 213 positioned in intermediate exhaust pipe 207 between downwardly and upwardly directed exhaust pipes 204, 206. Outlet 215 of diesel particulate filter 214 may be connected to the intermediate exhaust pipe between first valve 212 and second valve 213.

In FIG. 5, exhaust pipe valve 212 is shown in the open position and exhaust pipe valve 213 is closed so that exhaust may exit through the downwardly directed exhaust pipe. Exhaust pipe valves 212, 213 may be butterfly valves that may be opened and closed using exhaust temperature controls 203. When exhaust pipe valve 212 is closed and exhaust pipe valve 213 is open, exhaust may exit through upward exhaust pipe 206. Mechanical linkage 223 may be provided between valves 212 and 213 to simultaneously open one valve while closing the other valve, so that only one valve is open at the same time.

In the embodiment of FIGS. 4-5, exhaust temperature valve controls 203 may include a temperature sensor such as thermistor 205 connected to a relay that powers solenoid 211 to open or close valves 212 and 213. When exhaust temperature is in a normal range, typically below a specified temperature such as 200 degrees C., the voltage drop across thermistor 205 may be small. The thermistor's small voltage drop may engage a relay which provides power to solenoid 211 to open first valve 212 and close second valve 213 to direct exhaust downwardly through exhaust pipe 204. When exhaust temperature periodically increases above the normal range or specified temperature such as 200 degrees C., the voltage drop across thermistor 205 may be larger. The voltage may be high enough to disengage solenoid 211 and cause first valve 212 to close while second valve 213 opens, directing exhaust upwardly through pipe 206.

Figure 6:
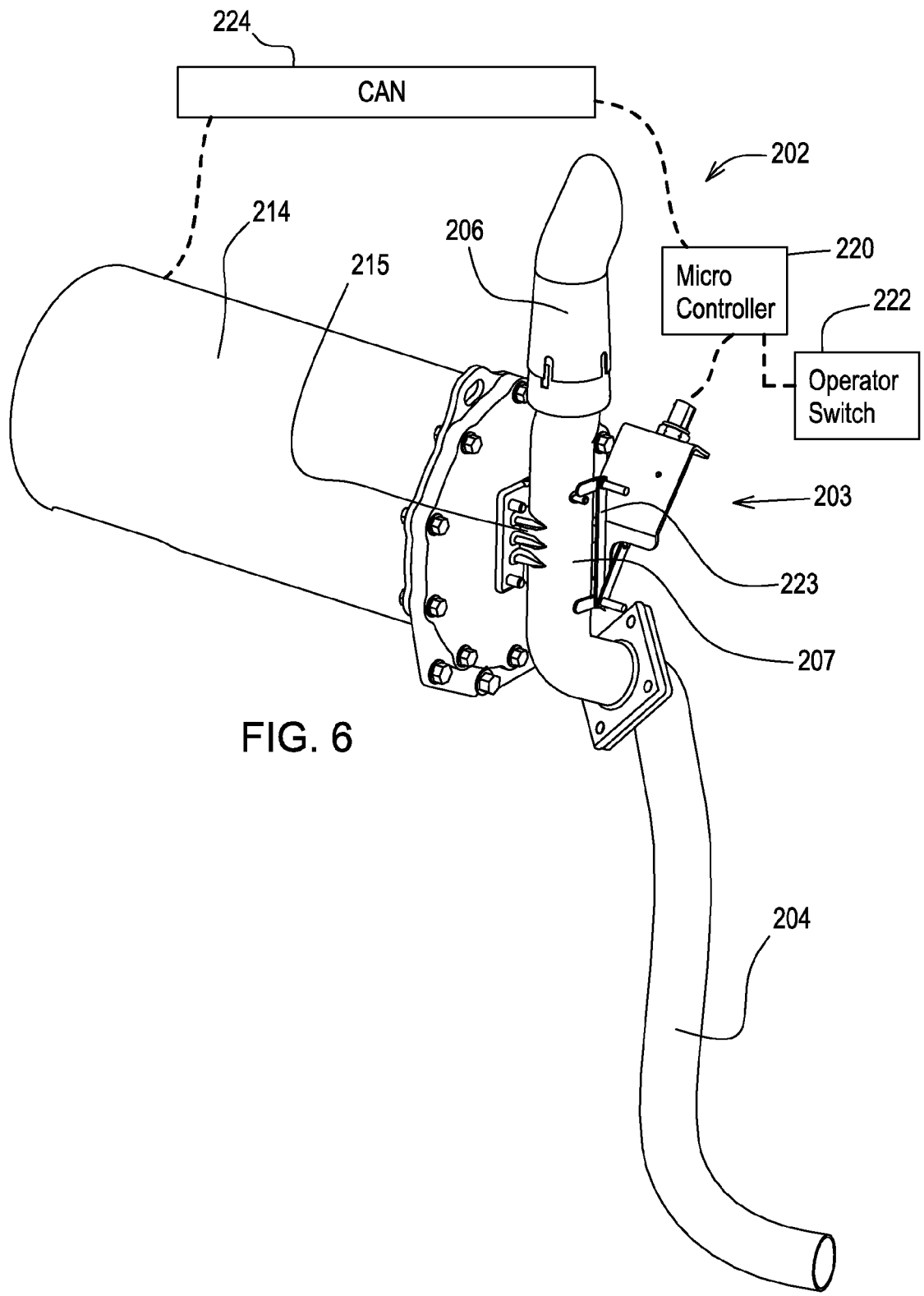
FIG. 6 is a perspective view of a bi-directional tractor exhaust system according to a third embodiment of the invention.

In the embodiment of FIG. 6, bi-directional tractor exhaust system controls may include microcontroller 220 and operator switch 222 connected to CAN network 224. Microcontroller 220 may monitor exhaust temperature via a temperature sensor in or connected to diesel particulate filter 214. When the microcontroller receives signals from the temperature sensor indicating regeneration of the diesel particulate filter, or indicating exhaust temperature above the normal range or maximum such as 200 degrees C., the microcontroller may cut off power to solenoid 211 causing first valve 212 to close and second valve 213 to open. The microcontroller also may include logic to prevent entering regeneration unless first valve 212 is closed and second valve 213 is open, thus preventing exhaust from exiting downwardly during regeneration.

In the embodiment of FIG. 6, the bi-directional exhaust system also may include operator switch 222 that an operator may actuate from the tractor cab to open or close valves 212, 213 to direct exhaust either downwardly or upwardly. The operator switch may function independently of the exhaust temperature valve controls, or the exhaust temperature controls may override the operator switch. For example, if the temperature sensor indicates regeneration or indicates exhaust temperature exceeds a maximum such as 200 degrees C., microcontroller 220 may override operator switch 222 and cut off power to solenoid 211, close first valve 212 and open second valve 213 so that exhaust exits upwardly. Additionally, first valve 212 may return to the closed position and second valve 213 may open if power is lost or removed from the system.

Having described a preferred embodiment, it will become apparent that various modifications can be made without departing from the scope of the invention as defined in the accompanying claims.

The invention claimed is:

1. A bi-directional tractor exhaust system, comprising:
   a downwardly directed exhaust pipe configured to provide exhaust flow exiting below an internal combustion engine connected to an upwardly directed exhaust pipe configured to provide exhaust flow exiting above the internal combustion engine;
   an exhaust pipe valve mounted in the downwardly directed exhaust pipe; and
   an actuator connected to the exhaust pipe valve and moveable between a first position opening the exhaust pipe valve to direct exhaust through the downwardly directed exhaust pipe, and a second position closing the exhaust pipe valve to direct exhaust through the upwardly directed exhaust pipe, wherein the downwardly directed exhaust pipe and upwardly directed exhaust pipe are connected together adjacent an outlet of a diesel particulate filter; and
   a switch connected to the actuator and to a controller that prevents initiation of regeneration of the diesel particulate filter unless the switch indicates the exhaust pipe valve is closed.

2. The bi-directional tractor exhaust system of claim 1 further comprising an intermediate exhaust pipe positioned between the downwardly directed exhaust pipe and the upwardly directed exhaust pipe, the upwardly directed exhaust pipe positioned inside and having a smaller diameter than the intermediate exhaust pipe.

3. The bi-directional tractor exhaust system of claim 1 wherein the exhaust pipe valve is a butterfly valve.

4. A bi-directional tractor exhaust system, comprising:
   a downwardly directed exhaust pipe configured to provide exhaust flow exiting below an internal combustion engine, an upwardly directed exhaust pipe configured to provide exhaust flow exiting above the internal combustion engine, and an intermediate exhaust pipe between the downwardly directed and upwardly directed exhaust pipes; the intermediate exhaust pipe connected to the outlet of a diesel particulate filter;
   an exhaust pipe valve in the downwardly directed exhaust pipe that may be opened or closed by an actuator to direct exhaust through the downwardly directed exhaust pipe when exhaust temperature from the diesel particulate filter is in a normal temperature range, and through the upwardly directed exhaust pipe when the exhaust temperature is in an elevated range; and
   a controller connected to the actuator and to a diesel particulate filter to prevent initiation of regeneration of the diesel particulate filter unless the exhaust pipe valve directs exhaust through the upwardly directed exhaust pipe.

5. The bi-directional tractor exhaust system of claim 4 further comprising a pair of exhaust pipe valves mechanically linked together.

6. The bi-directional tractor exhaust system of claim 4 further comprising a thermistor that operates a solenoid to close the exhaust pipe valve if exhaust temperature is in the elevated range.

7. The bi-directional tractor exhaust system of claim 4 wherein the actuator contacts a switch that signals a controller if the exhaust pipe if the exhaust pipe valve is open or closed.

\* \* \* \* \*